United States Patent
Okumiya et al.

(10) Patent No.: US 10,816,317 B2
(45) Date of Patent: Oct. 27, 2020

(54) STRAIN SENSOR ELEMENT

(71) Applicant: Yamaha Corporation, Hamamatsu-shi, Shizuoka (JP)

(72) Inventors: Yasuro Okumiya, Mori-machi (JP); Katsunori Suzuki, Hamamatsu (JP); Koji Yataka, Hamamatsu (JP); Yusuke Sato, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 228 days.

(21) Appl. No.: 16/027,968

(22) Filed: Jul. 5, 2018

(65) Prior Publication Data
US 2018/0328708 A1 Nov. 15, 2018

Related U.S. Application Data

(63) Continuation of application No. PCT/JP2016/084182, filed on Nov. 17, 2016.

(30) Foreign Application Priority Data

Jan. 6, 2016 (JP) .................................. 2016-001321

(51) Int. Cl.
*G01B 7/16* (2006.01)
*G01L 5/22* (2006.01)
(Continued)

(52) U.S. Cl.
CPC .............. *G01B 7/18* (2013.01); *C01B 32/158* (2017.08); *G01L 1/22* (2013.01); *G01L 1/2287* (2013.01); *G01L 5/226* (2013.01); *B82Y 30/00* (2013.01)

(58) Field of Classification Search
CPC ........... G01L 1/22; G01L 1/2287; G01B 7/16; G01B 7/18
(Continued)

(56) References Cited

U.S. PATENT DOCUMENTS 9,476,782 B2 10/2016 Suzuki et al.
2010/0105992 A1* 4/2010 Oda .................. A41D 13/1281
600/301
2014/0331793 A1 11/2014 Suzuki et al.

FOREIGN PATENT DOCUMENTS

CN 104142118 A 11/2014
EP 2 801 549 A1 11/2014
(Continued)

OTHER PUBLICATIONS

International Search Report (PCT/ISA/210) issued in PCT Application No. PCT/JP2016/084182 dated Feb. 14, 2017 with English translation (four (4) pages).
(Continued)

*Primary Examiner* — Benjamin R Schmitt
(74) *Attorney, Agent, or Firm* — Crowell & Moring LLP

(57) ABSTRACT

Provided is a filamentous strain sensor element capable of detecting a relatively great tensile strain. The strain sensor element of which resistance value changes in response to stretch and to contraction in a longitudinal direction, includes: a first conductive portion that is filamentous and formed from a carbon nanotube bundle; and a second conductive portion that covers a peripheral surface of the first conductive portion and is elastic and conductive, in which the first conductive portion is discontinuous at one or a plurality of positions.

4 Claims, 5 Drawing Sheets

(51) Int. Cl.
*G01L 1/22* (2006.01)
*C01B 32/158* (2017.01)
*B82Y 30/00* (2011.01)

(58) Field of Classification Search
USPC .................................................. 73/763, 774
See application file for complete search history.

(56) References Cited

FOREIGN PATENT DOCUMENTS

| | | |
|---|---|---|
| JP | 2005-337819 A | 12/2005 |
| JP | 2015-78967 A | 4/2015 |
| JP | 2015-148588 A | 8/2015 |

OTHER PUBLICATIONS

Japanese-language Written Opinion (PCT/ISA/237) issued in PCT Application No. PCT/JP2016/084182 dated Feb. 14, 2017 (four (4) pages).
Extended European Search Report issued in counterpart European Application No. 16883697.1 dated Jun. 11, 2019 (six pages).
English translation of Chinese Office Action issued in counterpart Chinese Application No. 201680077370.2 dated Aug. 19, 2019 (seven pages).
Japanese-language Office Action issued in counterpart Japanese Application No. 2016-001321 dated Jun. 25, 2019 with unverified English translation (four pages).
English translation of Chinese Office Action issued in Chinese Application No. 201680077370.2 dated Mar. 30, 2020 (six (6) pages).

\* cited by examiner

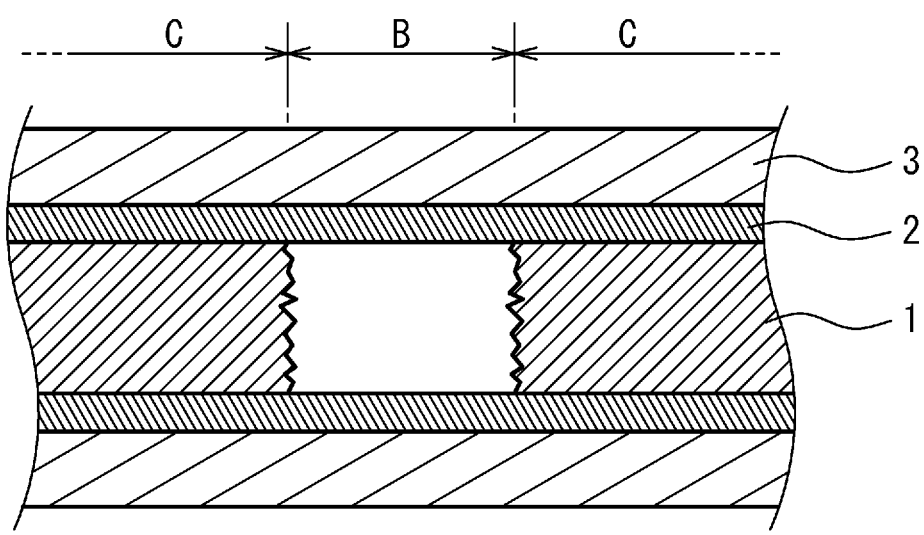
F I G. 2

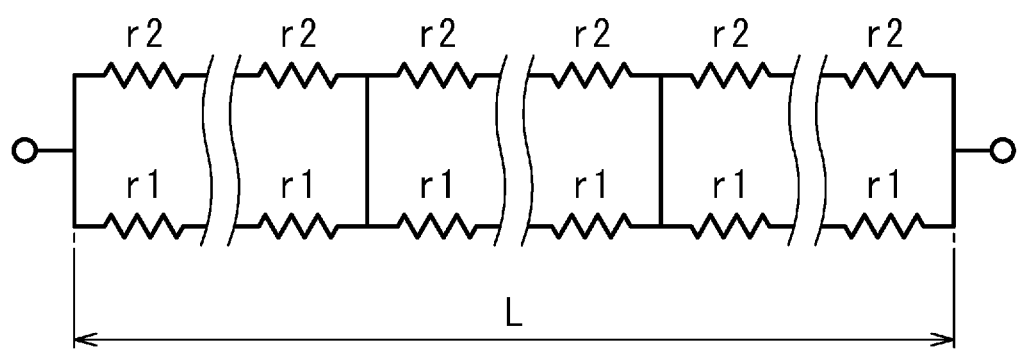
F I G. 3

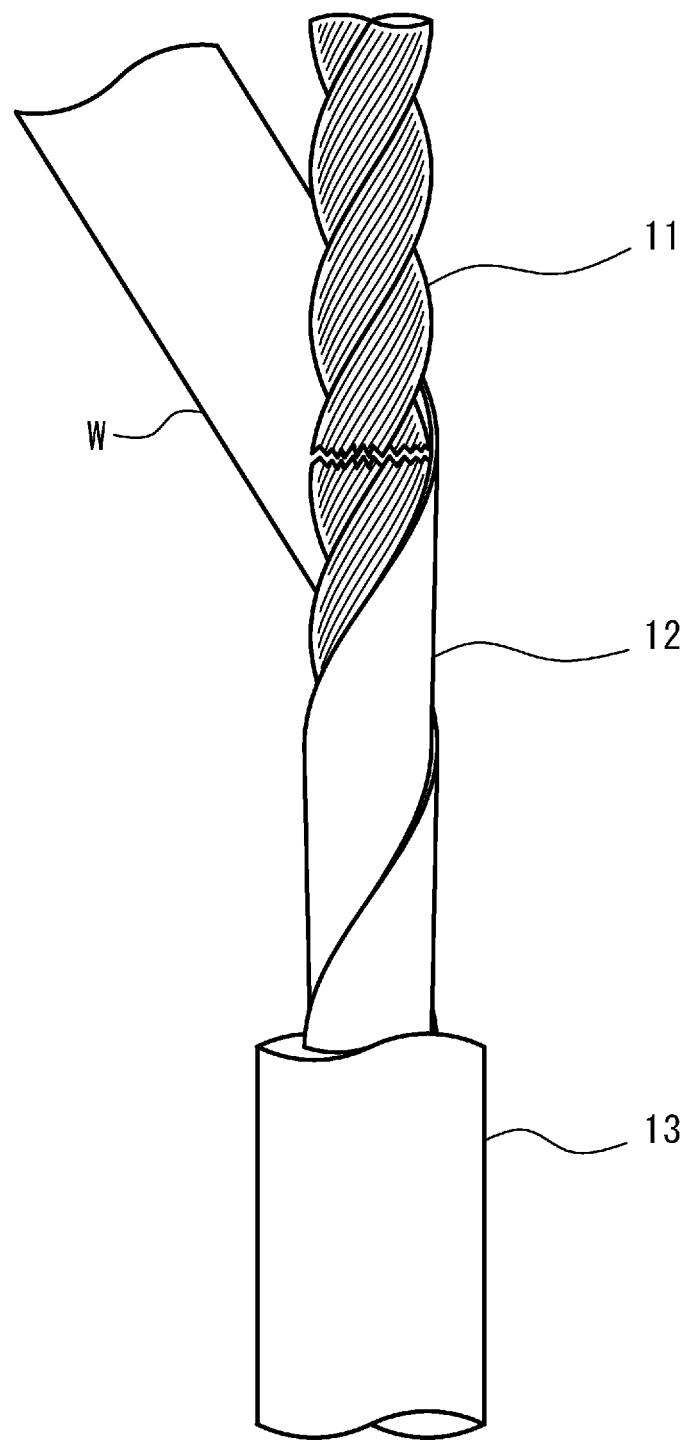
F I G . 5

STRAIN SENSOR ELEMENT

BACKGROUND OF THE INVENTION

Field of the Invention

The present invention relates to a strain sensor element.

Description of the Related Art

In recent years, application of a strain sensor element that detects a tensile strain is being expanded to a detection element for robots, wearable devices, etc., for example. Accordingly, various types of strain sensor elements are now demanded, including a filamentous or string-shaped strain sensor element.

As a filamentous strain sensor element, a strain sensor (element) has been proposed including: a filamentous conductor phase (core) including a plurality of insulating fibers oriented in a longitudinal direction and an organic phase that is conductive obtained by subjecting an organic polymer material, with which spaces between the plurality of insulating fibers are filled, to a heat treatment; and an insulating covering layer that covers the conductor phase (see Japanese Unexamined Patent Application, Publication No. 2005-337819).

In the strain sensor disclosed in the aforementioned publication, the conductor phase is formed by carbonizing the organic polymer material for imparting conductivity, and therefore may be torn when a great strain is applied. Consequently, the strain sensor disclosed in the aforementioned publication is only capable of measuring a relatively narrow range of tensile strain.

PRIOR ART DOCUMENT

Patent Document

Patent Document 1: Japanese Unexamined Patent Application, Publication No. 2005-337819

SUMMARY OF THE INVENTION

Problems to be Solved by the Invention

In view of the inconvenience described above, an object of the present invention is to provide a filamentous strain sensor element capable of detecting a relatively great tensile strain.

Means for Solving the Problems

According to an aspect of the invention made for solving the aforementioned problems, a strain sensor element of which resistance value changes in response to stretch and to contraction in a longitudinal direction, includes: a first conductive portion that is filamentous and formed from a carbon nanotube bundle; and a second conductive portion that covers a peripheral surface of the first conductive portion and is elastic and conductive, in which the first conductive portion is discontinuous at one or a plurality of positions.

Due to the peripheral surface of the first conductive portion being covered with the second conductive portion and the first conductive portion being discontinuous at one or the plurality of positions, the strain sensor element includes: parts where the first conductive portion is continuous, i.e., parts with relatively low resistance where the first conductive portion and the second conductive portion are connected in parallel; and parts where the first conductive portion is discontinuous, i.e., parts with relatively high resistance constituted only of the second conductive portion. A resistance value between both ends of the strain sensor element is equal to a resistance value of a circuit in which the parts of relatively low resistance and the parts of relatively high resistance are connected in series.

The second conductive portion preferably includes a carbon nanotube bundle and a resin composition with which the carbon nanotube bundle is impregnated.

The second conductive portion preferably includes a conductive strip helically wound around an outer periphery of the first conductive portion.

The strip preferably contains carbon nanotubes.

The strain sensor element preferably further includes a covering layer that covers a peripheral surface of the second conductive portion and is elastic and insulative.

Effects of the Invention

As described above, the strain sensor element of the present invention is capable of detecting the relatively great tensile strain.

BRIEF DESCRIPTION OF THE DRAWINGS

FIG. 2 is a schematic axial cross sectional view of the strain sensor element of FIG. 1;

FIG. 3 is a circuit diagram showing electric resistance of the strain sensor element of FIG. 1 in an initial state;

FIG. 5 is a schematic exploded front view of a strain sensor element according to another embodiment of the present invention different from that of FIG. 1.

DESCRIPTION OF THE EMBODIMENTS

Embodiments of the present invention will be described in detail hereinafter, with appropriate reference to the drawings.

First Embodiment

Figure 1:
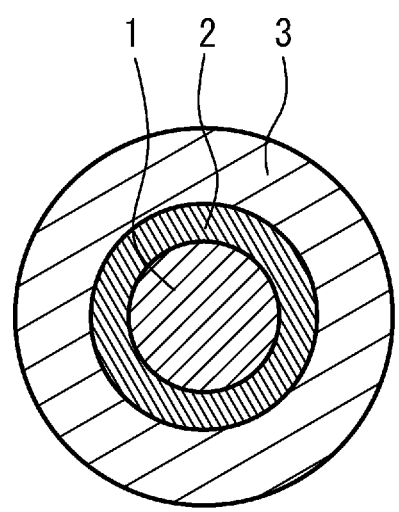
FIG. 1 is a schematic radial cross sectional view of a strain sensor element according to an embodiment of the present invention.

The strain sensor element illustrated in FIG. 1 is formed to be filamentous, and a resistance value (electric resistance) thereof changes in response to stretch and to contraction in the longitudinal direction. Accordingly, the strain sensor element is capable of detecting the tensile strain through measurement of the resistance value between both ends.

The strain sensor element includes: a filamentous first conductive portion 1 formed from the carbon nanotube bundle; and a second conductive portion 2 that covers the peripheral surface of the first conductive portion 1 and is elastic and conductive. The strain sensor element preferably further includes a covering layer 3 that covers the peripheral surface of the second conductive portion 2 and is elastic and insulative.

In the strain sensor element, the first conductive portion 1 is discontinuous at one or a plurality of positions in the longitudinal direction, as illustrated in FIG. 2. Meanwhile, the second conductive portion 2 is continuously provided over the entire length of the strain sensor element, without discontinuation.

Due to the first conductive portion 1 being discontinuous at one or a plurality of positions, the strain sensor element has a continuous region C in which the first conductive portion 1 is continuous, and a discontinuous region B in which the first conductive portion 1 is discontinuous. A length of the discontinuous region B may be 0 in a state in which no tensile stress in the longitudinal direction is applied to the strain sensor element. In other words, in the strain sensor element in a stress-free state, the length of the discontinuous region B may be 0, and adjacent continuous regions C in the first conductive portion 1 may be in contact and electrically continuous with each other.

In the continuous region C of the strain sensor element, the first conductive portion 1 and the second conductive portion 2 are connected in parallel, and the electric resistance in the longitudinal direction is relatively low. On the other hand, in the discontinuous region B constituted only of the second conductive portion 2, the electric resistance in the longitudinal direction is relatively high. When the strain sensor element stretches or contracts, a gap width of a discontinued part, i.e., a proportion of the parts with relatively high resistance, increases or decreases in response to the stretch or the contraction, and consequently the resistance value between both ends of the strain sensor element changes. By virtue of such a mechanism allowing detection of the tensile strain through the change of the resistance value, the strain sensor element is capable of detecting the relatively great tensile strain relatively accurately.

First Conductive Portion

The first conductive portion 1 may be formed from a carbon nanotube bundle. The carbon nanotube bundle is a fiber bundle in which a plurality of carbon nanotubes (monofilament) are oriented substantially in the longitudinal direction of the strain sensor element. The carbon nanotube bundle may contain an insulative fiber in order to adjust electric resistance.

The first conductive portion 1 preferably does not substantially contain a matrix (resin) that connects the plurality of carbon nanotubes. Such a constitution achieves high electric conductivity and enables relatively easy formation of the discontinuous region B.

The first conductive portion 1 is conductive in such a way that the plurality of carbon nanotubes are in overlapping contact to be electrically connected with each other, to thereby form an electric current path. When a great tensile stress is applied in the longitudinal direction, the first conductive portion 1, which is a carbon nanotube aggregate as described above, is torn and the electric current path is interrupted. As a result, after forming the second conductive portion 2 and preferably the covering layer 3, the discontinuous region B of the strain sensor element may be formed by applying a tensile stress that is great enough but does not tear the second conductive portion 2 and the covering layer 3, while holding both longitudinal sides of a position at which the discontinuous region B is to be formed, to thereby intentionally tear the first conductive portion 1.

The first conductive portion 1 is preferably constituted of the carbon nanotube bundles twisted together. Due to twisting the carbon nanotube bundles together into a filamentous shape, the carbon nanotubes inhibit longitudinal displacement each other. As a result, the continuous regions C on both sides of the discontinuous region B in the first conductive portion 1 are reliably electrically separated from each other, and consequently an improvement of detection accuracy of the tensile strain is enabled.

In the present embodiment, the second conductive portion 2 is formed by impregnating with a resin composition a superficial layer part (outer peripheral part in a cross section perpendicular to the longitudinal direction) of a single filamentous body obtained beforehand by twisting the carbon nanotube bundles together, while a central part of the carbon nanotube filamentous body not impregnated with the resin composition is made to be the first conductive portion 1.

The lower limit of an average diameter of the first conductive portion 1 is preferably 0.5 μm and more preferably 5 μm. Meanwhile, the upper limit of the average diameter of the first conductive portion 1 is preferably 5 mm and more preferably 1 mm. When the average diameter of the first conductive portion 1 is less than the lower limit, the electric resistance of the first conductive portion 1 and in turn an initial value of electric resistance of the strain sensor element increase, which may lead to insufficient detection accuracy. To the contrary, when the average diameter of the first conductive portion 1 is greater than the upper limit, formation of the first conductive portion 1 may not be easy, and detection of the tensile strain may be inaccurate due to the carbon nanotubes in the central part of the first conductive portion 1 sticking out to the discontinuous region B and short-circuited.

(Carbon Nanotubes)

As the carbon nanotubes in the carbon nanotube bundle constituting the first conductive portion 1, any of single-wall nanotubes (SWNT) having a single layer and multi-wall nanotubes (MWNT) having multilayers may be used. Of these, MWNT is preferred in light of electrical conductivity and thermal capacity, and MWNT having a diameter within a range of 1.5 nm or greater and 100 nm or less is more preferred.

The carbon nanotubes may be produced by any well-known process such as, for example, the CVD process, the arc process, the laser ablation process, the DIPS process, the CoMoCAT process, and the like. Of these, from the perspective that the carbon nanotubes (MWNT) of a desired size may be efficiently obtained, the CVD process is preferred in which iron as a catalyst and ethylene gas are employed. In this case, vertically oriented carbon nanotube crystals of a desired length can be obtained that were grown on a thin film of iron or nickel as a catalyst formed on a substrate, which may be a quartz glass substrate, a silicon substrate having an oxide film, or the like.

(Insulative Fiber)

A blend ratio of the insulative fiber in the first conductive portion 1 is set in accordance with the electric resistance to be obtained. The lower limit of the blend ratio of the insulative fiber in the first conductive portion 1 is 0%. Meanwhile, the upper limit of the blend ratio of the insulative fiber is preferably 50% by volume. When the blend ratio of the insulative fiber is greater than the upper limit, contact between the carbon nanotubes may be insufficient, leading to insufficient detection accuracy of the strain sensor element.

As the insulative fiber, any chemical fiber may be used. Although elasticity is not essential for the insulative fiber, using an elastic insulative fiber enables an improvement of strength of the first conductive portion 1. An elastic fiber usable as the insulative fiber is exemplified by spandex (elastic urethane fiber) and the like.

A diameter of the insulative fiber may fall within a range similar to that of the carbon nanotubes, and preferably substantially equal to the diameter of the carbon nanotubes.

A procedure of forming the carbon nanotube bundle and in turn the first conductive portion 1 from the carbon nanotubes, is exemplified by a procedure involving: forming a catalyst layer on a substrate for crystal growth; growing a plurality of carbon nanotubes oriented in one direction by the CVD process; and successively drawing the plurality of carbon nanotubes in a similar manner to spinning of a natural yarn. Blending of the insulative fiber is enabled by, for example, scattering the insulative fiber on the substrate for crystal growth on which the carbon nanotubes have been grown. Specifically, when a part of the carbon nanotubes grown on the substrate for crystal growth is drawn, other carbon nanotubes and the insulative fiber follow the part and are oriented in one direction, whereby a successive carbon nanotube bundle can be drawn. The first conductive portion 1 may also be formed by tying or spinning a plurality of carbon nanotube bundles together.

Second Conductive Portion

In the strain sensor element illustrated in FIG. 1, the second conductive portion 2 includes carbon nanotube bundles and a resin composition with which the carbon nanotube bundle is impregnated.

As described above, in the present embodiment, the carbon nanotube bundles of the second conductive portion 2 is integrally twisted with the carbon nanotube bundle(s) constituting the first conductive portion 1. Specifically, the second conductive portion 2 is the peripheral part in the cross section perpendicular to the longitudinal direction of the single filamentous body obtained beforehand by twisting the carbon nanotube bundles, the peripheral part being impregnated with the resin composition. Due to the second conductive portion 2 including the carbon nanotube bundle and the resin composition with which the carbon nanotube bundle is impregnated, the second conductive portion 2 is enabled to have relatively great elasticity and appropriate resistivity. Accordingly, more reliable detection of the relatively great tensile strain is enabled.

The lower limit of an average thickness of the second conductive portion 2 is preferably 0.5 μm and more preferably 20 μm. Meanwhile, the upper limit of the average thickness of the second conductive portion 2 is preferably 2 mm and more preferably 1 mm. When the average thickness of the second conductive portion 2 is less than the lower limit, strength of the second conductive portion 2 may be insufficient. To the contrary, when the average thickness of the second conductive portion 2 is greater than the upper limit, the resistivity of the second conductive portion 2 may be too low.

(Resin Composition)

The resin composition with which the carbon nanotube bundles in the second conductive portion 2 are impregnated contains an insulative and elastic synthetic resin or a rubber as a principal component. Due to the resin composition being insulative, the resistivity of the second conductive portion 2 can be set within an appropriate range for detecting the tensile strain by way of the resistance value between both ends of the strain sensor element, as described later.

As the principal component of the resin composition in the second conductive portion 2, the rubber is particularly preferred. Due to using the rubber, an improvement of flexibility of the second conductive portion 2 is enabled.

Examples the synthetic resin include a phenol resin (PF), an epoxy resin (EP), a melamine resin (MF), a urea resin (UF), an unsaturated polyester (UP), an alkyd resin, polyurethane (PUR), thermosetting polyimide (PI), polyethylene (PE), high density polyethylene (HDPE), medium density polyethylene (MDPE), low density polyethylene (LDPE), polypropylene (PP), polyvinyl chloride (PVC), polyvinylidene chloride, polystyrene (PS), polyvinyl acetate (PVA), an acrylonitrile-butadiene-styrene resin (ABS), an acrylonitrile-styrene resin (AS), polymethyl methacrylate (PMMA), polyamide (PA), polyacetal (POM), polycarbonate (PC), modified-polyphenylene ether (m-PPE), polybutylene terephthalate (PBT), polyethylene terephthalate (PET), cyclic polyolefin (COP), and the like.

Examples of the rubber include a natural rubber (NR), an isobutylene-isoprene rubber (IIR), an isoprene rubber (IR), an ethylene propylene rubber (EPDM), a butadiene rubber (BR), a urethane rubber (U), a styrene-butadiene rubber (SBR), a silicone rubber (Q), a chloroprene rubber (CR), a chlorosulphonated polyethylene rubber (CSM), an acrylonitrile-butadiene rubber (NBR), a chlorinated polyethylene (CM), an acrylic rubber (ACM), an epichlorohydrin rubber (CO, ECO), a fluororubber (FKM), PDMS, and the like. Of these rubbers, a natural rubber is preferred in light of strength and the like.

In addition, the resin composition in the second conductive portion 2 is preferably formed from an aqueous emulsion. The term "aqueous emulsion" as referred to means an emulsion in which a dispersion medium contains water as a principal component. Since the carbon nanotubes are highly hydrophobic, impregnating the carbon nanotube filamentous body formed from the carbon nanotube bundles with the aqueous emulsion, for example by means of coating or immersion, enables formation of the second conductive portion 2 and the first conductive portion 1 in the central part of the carbon nanotube filamentous body not impregnated with the resin composition. It is to be noted that the aqueous emulsion enables, through a drying step, formation of the second conductive portion 2 that is more stable.

Although the principal component of the dispersion medium in the aqueous emulsion is water, other hydrophilic dispersion media such as alcohol may also be contained. A dispersoid in the emulsion is typically a resin, preferably the aforementioned rubber, and particularly preferably the natural rubber. The dispersoid may also be a polyurethane. A preferred emulsion is exemplified by latex as generally referred to, with water as a dispersion medium and a rubber as a dispersoid. Natural rubber latex is more preferred. Using natural rubber latex enables formation of the second conductive portion 2 that is thin and strong.

In addition, the resin composition in the second conductive portion 2 preferably contains a coupling agent. Due to the resin composition in the second conductive portion 2 containing the coupling agent, an increase in bonding strength with the carbon nanotubes in the second conductive portion 2 and in turn an increase in reliability of the second conductive portion 2 are enabled.

The coupling agent is exemplified by: amino coupling agents such as an amino silane coupling agent, an amino titanium coupling agent and an amino aluminum coupling agent; silane coupling agents; and the like.

The lower limit of a content of the coupling agent with respect to 100 parts by mass of a resin component in the second conductive portion 2 is preferably 0.1 parts by mass and more preferably 0.5 parts by mass. Meanwhile, the upper limit of the content of the coupling agent with respect to 100 parts by mass of the resin component in the second conductive portion 2 is preferably 10 parts by mass and more preferably 5 parts by mass. When the content of the coupling agent is less than the lower limit, adhesiveness to the carbon nanotubes may not be sufficiently improved. To the contrary, when the content of the coupling agent is greater than the upper limit, an amount of residual amine and the like, which do not contribute to the bonding between the resin and the carbon nanotubes, increases, and consequently the quality of the strain sensor element may be deteriorated.

Furthermore, the resin composition in the second conductive portion 2 preferably contains a dispersant that is adsorptive. The dispersant that is adsorptive is exemplified by: a dispersant in which an adsorptive group moiety forms a salt structure (e.g., alkyl ammonium salt); a dispersant having in a molecule a hydrophilic group (e.g., polyether) that is capable of interacting with a hydrophobic group (for example, an alkyl chain, an aromatic ring, etc.) in the first conductive portion 1; and the like.

The lower limit of a content of the dispersant with respect to 100 parts by mass of the resin component in the resin composition in the second conductive portion 2 is preferably 0.1 parts by mass and more preferably 1 part by mass. Meanwhile, the upper limit of the content of the dispersant with respect to 100 parts by mass of the resin component is preferably 5 parts by mass and more preferably 3 parts by mass. When the content of the dispersant is less than the lower limit, bonding strength between the first conductive portion 1 and the second conductive portion 2 may be insufficient. To the contrary, when the content of the dispersant is greater than the upper limit, an amount of the dispersant, which does not contribute to the bonding to the first conductive portion 1, increases, and consequently the quality of the strain sensor element may be deteriorated.

Covering Layer

The covering layer 3 contains an insulative and elastic synthetic resin or a rubber as a principal component, and covers the peripheral surface of the second conductive portion 2 to thereby prevent the carbon nanotubes from being damaged by contact with surrounding objects and prevent an unwanted substance from entering into the second conductive portion 2 and inhibiting the electrical contact between the carbon nanotubes.

The material for the covering layer 3 may be similar to the resin composition in the second conductive portion 2. In the case of forming the second conductive portion 2 by impregnating the superficial layer part of the carbon nanotube filamentous body with the resin composition as described above, the covering layer 3 may also be formed as a layer of the resin composition not having penetrated into and remaining on the periphery of the carbon nanotube filamentous body, by applying an excessive amount of the resin composition on the carbon nanotube filamentous body. Due to further including the covering layer 3 that covers the peripheral surface of the second conductive portion 2 and is elastic and insulative, the second conductive portion 2 can be prevented from being damaged by contact with external objects, while tear of the first conductive portion 1 and the second conductive portion 2 and inaccuracy of detected values, owing to tensile stress concentrated on a certain part in the longitudinal direction, can be prevented.

The lower limit of an average thickness of the covering layer 3 is preferably 0.1 µm and more preferably 0.2 µm. Meanwhile, the upper limit of the average thickness of the covering layer 3 is preferably 2 mm and more preferably 1 mm. When the average thickness of the covering layer 3 is less than the lower limit, protection of the first conductive portion 1 and the second conductive portion 2 may be insufficient. To the contrary, when the average thickness of the covering layer 3 is greater than the upper limit, stretch and contraction of the strain sensor element may be inhibited.

Strain Detection

A mechanism of detection of the tensile strain by the aforementioned strain sensor element will be described hereinafter.

FIG. 3 shows a model illustrating the electric resistance between both ends of the strain sensor element, in which: the resistance value of the first conductive portion 1 per infinitesimal unit length is r1 (Ω); the resistance value of the second conductive portion 2 per infinitesimal unit length is r2 (Ω); the number of the infinitesimal unit lengths (value obtained by dividing the total length by the infinitesimal unit length) in the first conductive portion 1 in the stress-free state is L; and the length of the discontinuous region B is 0.

The resistance value (initial value) R0 (Ω) between both ends of the strain sensor element in the stress-free state shown in FIG. 3 may be represented by the following formula (1):

$$R0 = L \times (r1 \times r2)/(r1+r2) \quad (1)$$

Figure 4:
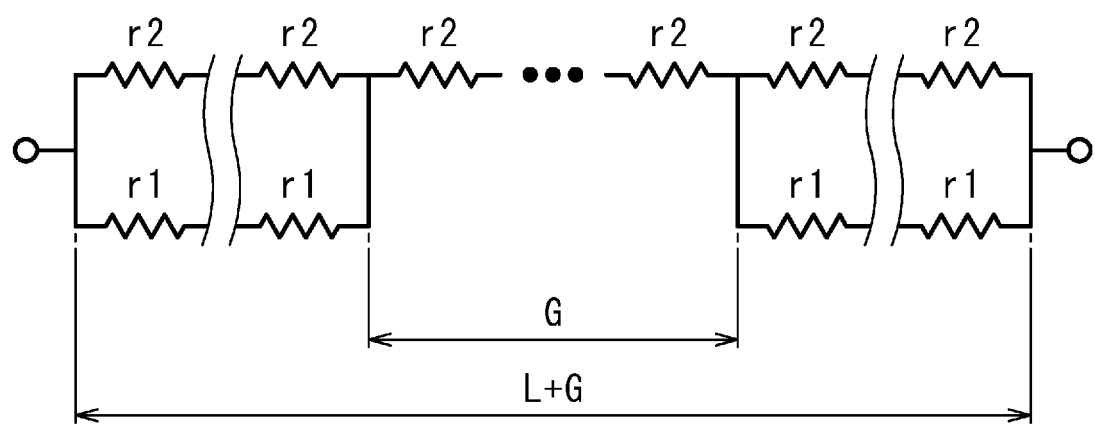
FIG. 4 is a circuit diagram showing electric resistance of the strain sensor element of FIG. 1 in a stretched state.

FIG. 4 shows a model of the strain sensor element shown in the model of FIG. 3 stretched by a length G (number of infinitesimal unit lengths). In this model, the number L of the infinitesimal unit lengths in the first conductive portion 1 is constant, and the number of the infinitesimal unit lengths in the discontinuous regions B is G. It is to be noted that although the discontinuous region B may be provided in a divided manner at a plurality of positions, only one discontinuous region B, which is electrically equal, is shown in the drawing. Strictly speaking, the resistance value r2 per infinitesimal unit length increases as the cross sectional area of the second conductive portion 2 decreases in response to stretch and contraction; however, in the following explanation, the resistance value r2 is assumed to be constant in the present model.

The resistance value R(G) between both ends of the strain sensor element shown in FIG. 4 may be represented by the following formula (2), as a function of the number G of the infinitesimal unit lengths in the discontinuous regions B, i.e., an amount of change of the length of the strain sensor element:

$$R(G) = L \times (r1 \times r2)/(r1+r2) + G \times r2 \quad (2)$$

In the strain sensor element, by increasing the resistance value r2 per infinitesimal unit length of the second conductive portion 2, a relative increase in the amount of change of the resistance value, i.e., a difference between the initial value of the resistance value represented by the formula (1) and the resistance value in the stretched state represented by the formula (2), is enabled. Meanwhile, by decreasing the resistance value r1 per infinitesimal unit length of the first conductive portion 1, a relative decrease in the resistance value in the stress-free state represented by the formula (1) is enabled without decreasing the amount of change of the resistance value.

According to the strain sensor element, which obtains the change of the resistance value through the mechanism as described above, it is substantially not necessary to increase the change of the resistance value of the second conductive portion 2 which stretches and contracts (the resistance value is not required to change), and consequently the elasticity of the second conductive portion 2 may be improved relatively easily. As a result, the strain sensor element is capable of detecting the relatively great tensile strain relatively accurately. In addition, since the discontinuous region is a space, an end face of the first conductive portion 1 is easily movable, resulting in superior responsiveness.

Second Embodiment

A strain sensor element according to another embodiment of the present invention illustrated in FIG. 5 includes: a first conductive portion 11 that is filamentous and formed from carbon nanotube bundles; a second conductive portion 12 that covers the peripheral surface of the first conductive portion 11 and is elastic and conductive; and a covering layer 13 that covers the peripheral surface of the second conductive portion 12 and is elastic and insulative.

In the strain sensor element, the first conductive portion 11 is discontinuous at one or a plurality of positions in the longitudinal direction. Meanwhile, the second conductive portion 12 is continuously provided over the entire length of the strain sensor element, without discontinuation.

The first conductive portion 11 and the covering layer 13 of the strain sensor element illustrated in FIG. 5 may be similar to the first conductive portion 1 and the covering layer 3 of the strain sensor element illustrated in FIG. 1. Therefore, explanation of the first conductive portion 11 and the covering layer 13 of the strain sensor element illustrated in FIG. 5 is omitted.

Second Conductive Portion

The second conductive portion 12 includes a conductive strip W helically wound around an outer periphery of the first conductive portion 11. Due to the strip W helically wound, reliable covering of the first conductive portion 11 with the second conductive portion 12 is enabled.

In addition, the strip W helically wound is elastic and contractible like a coiled spring, and is therefore less likely to be torn even when the strain sensor element is greatly stretched or contracted. Consequently, the strip W enables a range of the tensile strain detectable by the strain sensor element to be relatively extended.

The average thickness of the second conductive portion 12 of the strain sensor element illustrated in FIG. 5 may be equal to the average thickness of the second conductive portion 2 of the strain sensor element illustrated in FIG. 1.

The strip W may be any material which is conductive and flexible, and is exemplified by: a woven fabric, a nonwoven fabric, a knitted fabric, and the like formed from a conductive fiber and impregnated with the resin composition; a resin matrix containing conductive particles or fibers; and the like.

It is preferred that the strip W contains a plurality of conductive fibers in contact with each other, oriented in substantially one direction, preferably in the longitudinal direction of the strip W. Due to the strip W containing fibrous conductors capable of easily maintaining the mutual contact state, inhibition of an increase in the electric resistance of the second conductive portion 12 in response to the stretch and contraction of the strain sensor element is enabled.

The strip W containing the conductive fibers may be impregnated with the resin composition prior to winding; however, it is preferred that the conductive fibers shaped into a strip is helically wound around the outer periphery of the first conductive portion 11 and then impregnated with the resin composition. Due to impregnating the strip W formed from the conductive fiber with the resin composition after winding, winding of the strip W is relatively easy, and more reliable maintenance of conductivity of the second conductive portion 12 is enabled through reinforcement of the strip W with the resin composition.

As the conductive fiber, carbon nanotube is suitably used. Since carbon nanotube is fine, the strip W can be made thin. Specifically, a thin film formed from a plurality of carbon nanotubes oriented in substantially one direction may be suitably used as the strip W.

Alternatively, the covering layer 13 may be formed from the resin composition not penetrating the strip W, by applying an excessive amount of the resin composition with which the strip W is impregnated.

The carbon nanotube contained in the strip W may be similar to the carbon nanotube constituting the carbon nanotube bundle in the first conductive portion 11. The resin composition with which the strip W is impregnated may be similar to the resin composition with which the second conductive portion 2 of the strain sensor illustrated in FIG. 1 is impregnated.

The lower limit of an average thickness of the strip W is preferably 0.5 μm and more preferably 20 μm. Meanwhile, the upper limit of the average thickness of the strip W is preferably 2 mm and more preferably 1 mm. When the average thickness of the strip W is less than the lower limit, strength of the strip W may be insufficient. To the contrary, when the average thickness of the strip W is greater than the upper limit, flexibility of the strip W may be insufficient and consequently a detectable range of the strain sensor may be narrow.

The lower limit of an average width of the strip W is preferably 0.2 mm and more preferably 0.5 mm. Meanwhile, the upper limit of the average width of the strip W is preferably 5 mm and more preferably 2 mm. When the average width of the strip W is less than the lower limit, winding of the strip W may not be easy. To the contrary, when the average width of the strip W is greater than the upper limit, stretchability and contractibility of the strain sensor element may be insufficient.

OTHER EMBODIMENTS

The embodiments described above do not restrict the constituent features of the present invention. Therefore, any omission, substitution and addition of each of the constituent features of the embodiments can be made on the basis of the description of the present specification and common general technical knowledge, and such omitted, substituted and/or added features are to be construed to entirely fall under the scope of the present invention.

In the strain sensor element, the second conductive portion may also be formed by applying a resin composition containing conductive particles or fibers on the peripheral surface of the first conductive portion.

The strain sensor element may not have the covering layer.

In the strain sensor element, the discontinuous region may have a width in the longitudinal direction in the stress-free state. A procedure for forming such a strain sensor element in which the first conductive portion has gap(s) in the discontinuous region, allowing for electrical division in the initial state is exemplified by a procedure of forming the second conductive portion and the covering layer in a state in which stress is applied to the first conductive portion. The discontinuous region having a width in the longitudinal direction in the initial state enables a correlative relationship to be improved between the tensile strain and the resistance value between both ends of the strain sensor element, when the tensile strain is small.

INDUSTRIAL APPLICABILITY

The strain sensor element of the present invention may be suitably used as a detection element for wearable devices and the like.

EXPLANATION OF THE REFERENCE SYMBOLS 1, 11 First conductive portion
2, 12 Second conductive portion
3, 13 Covering layer
B Discontinuous region
C Continuous region
G Length of discontinuous region
L Length of first conductive portion
r1 Resistance value per infinitesimal unit length of first conductive portion
r2 Resistance value per infinitesimal unit length of second conductive portion
W Strip

What is claimed is:

1. A strain sensor element of which resistance value changes in response to stretch and to contraction in a longitudinal direction, comprising:
    a first conductive portion that is filamentous and formed from a carbon nanotube bundle twisted together, the carbon nanotube bundle not being impregnated with a resin composition; and
    a second conductive portion that covers a peripheral surface of the first conductive portion and is elastic and conductive,
    wherein the first conductive portion is discontinuous at one or a plurality of positions, and
    the second conductive portion comprises a conductive strip helically wound around an outer periphery of the first conductive portion.

2. The strain sensor element according to claim 1, wherein the second conductive portion comprises a carbon nanotube bundle and a resin composition with which the carbon nanotube bundle is impregnated.

3. The strain sensor element according to claim 1, wherein the conductive strip comprises carbon nanotubes.

4. The strain sensor element according to claim 1, further comprising a covering layer that covers a peripheral surface of the second conductive portion and is elastic and insulative.

* * * * *